Patented Sept. 14, 1954

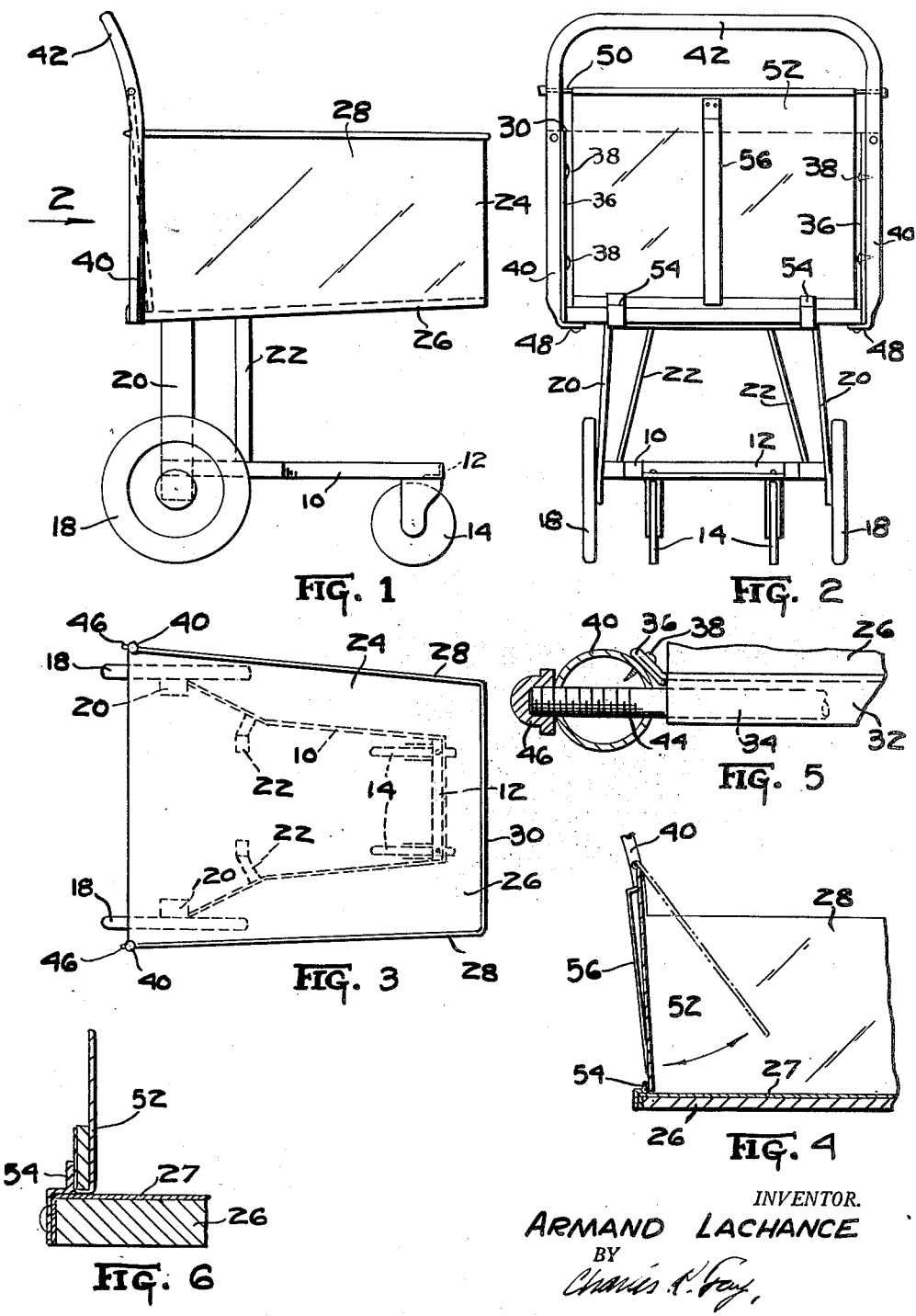

2,689,134

UNITED STATES PATENT OFFICE 2,689,134

NESTABLE CART

Armand Lachance, Worcester, Mass.

Application May 8, 1951, Serial No. 225,110

1 Claim. (Cl. 280—33.99)

This invention relates to new and improved nestable carts and the principal object of the present invention resides in the provision of a very sturdy large capacity hand cart, the same being nestable with other like carts so as to save space when not in use, but at the same time being rugged in nature and particularly adapted for outdoor use and curb service, although the cart also is usable in any relation where convenient or desired.

Another object of the invention resides in the provision of a strong and rugged nestable cart comprising a relatively simple open horizontal frame having front and rear wheels thereon and including uprights secured thereto adjacent the rear wheels, said uprights extending vertically and supporting at their top ends a container in spaced relation vertically relative to the frame, said container having open top and rear wall areas and including a bottom to which the uprights are secured and front and side walls, the latter being continuous and rolled over at their top edges receiving a U-shaped rod which rigidifies and strengthens the entire container; in combination with a pusher type handle at the rear wall opening, the ends of said rod extending through the handle and being secured thereto, and the free edges of the side walls being secured to portions thereof also, the pusher handle providing a swinging support for a rear wall closing member which is swingable for nesting purposes, all to the end that the present cart shall be strong and rugged in construction and capable of standing extreme abuse in the use thereof while still remaining essentially simple in construction and inexpensive to manufacture.

Other objects and advantages of the invention will appear hereinafter.

Reference is to be had to the accompanying drawings in which

Fig. 1 is a view in side elevation of a cart according to the invention;

Fig. 2 is a rear view thereof looking in the direction of arrow 2 in Fig. 1;

Fig. 3 is a top plan view with the swinging back omitted;

Fig. 4 is a sectional view of the rear end of the container portion of the cart;

Fig. 5 is an enlarged detail view of the connection to the pusher handle; and

Fig. 6 is an enlargement of a portion thereof illustrating the stop construction for the swinging back.

In order to carry out the invention, there is provided an open framework which is adapted to extend horizontally and upon which front and rear wheels are mounted. This framework is generally indicated at 10 and comprises a pair of side members, see Fig. 3, a front cross member 12 on which are mounted a pair of swiveling front wheels 14.

A pair of rear wheels 18 are provided at the rear of the frame 10, being mounted on suitable bearings provided at the lower ends of a pair of rear uprights 20 carried by the open frame member 10. Forwardly of the uprights 20 there are a pair of further uprights 22 mounted on the frame 10 and extending upwardly to a slightly greater extent so as to support a container or receptacle generally indicated at 24 with its bottom 26 at a slight angle to the horizontal. The uprights 22 are but slightly in advance of uprights 20, but the bottom member of the container is made of relatively strong material such as a half-inch ply wood covered for instance with metal as at 27, so that the uprights 20 and 22 rigidly mount the container in forwardly extending unsupported condition as clearly shown in Fig. 1.

Connected to the bottom member 26 in any desired way is a sheet metal member forming sides 28 and front 30, this sheet material being bent into the form of a U as seen in Fig. 3 to accomplish this purpose. The top edges of the sheet are rolled over as clearly shown in Fig. 5 at 32 and a rod 34 extends all the way around the top edges of sides 28 and front wall 30 and is housed within the rolled over portion 32 which is essence forms a tube, thus providing a very rigid construction.

The free ends of the walls 28 extend to the rear slightly as at 36 and are connected by fasteners 38 to the legs 40 of a U-shaped tubular member which forms a handle 42 at the closed end of the cart. The extending ends 44 of rod 34 are threaded and extend directly through the tubular parts 40 as shown in Fig. 5 and nuts 46 may be used to cap these extending ends and secure the entire construction together in very rigid form. The rolled ends of the tubular parts 40 are flattened and inturned as at 48 and are secured by any desired fastening means to the bottom member 26.

It is seen that the pusher handle 40, 42 forms an important structural member of the device and secures the side walls 28 against separation at the rear of the container as well as providing rigid vertical strengthening members. In addition, however, the members 40 provide a support for a rod 50 on which is mounted a swinging member 52 which is adapted to close the rear opening of the container and is stopped against swinging outwardly by a pair of strap-like stops 54. These stops do not prevent the nesting therewith of other like carts which will extend into nesting condition with the cart shown by having the front end thereof thrust into the rear opening described above. The swinging member 52 may have a strengthening guide 56 to prevent injury thereto when other carts are thrust into engagement therewith for nesting purposes as described.

It will be seen that this invention provides a very strong and rugged, large capacity hand cart which is nestable and which may be used under many and adverse conditions for its intended purpose without damage. The carts are nestable to a point where the rear wheels substantially touch each other, and the container itself can be made of other material than that shown such as expanded metal, wire, etc.

Having thus described my invention and the advantages thereof, I do not wish to be limited to the details herein disclosed otherwise than as set forth in the claim, but what I claim is:

A nestable shopping cart or the like, comprising an elongated receptacle portion tapered from its rear end forwardly, a similarly tapered elongated wheeled undercarriage portion and multiple spacing means interconnecting the receptacle and carriage portions adjacent their rear ends, leaving an unobstructed space at the front portion, said carriage portion comprising a pair of spaced side frame members, a front wheel supporting cross member at the forward end thereof, said side members diverging sharply outwardly adjacent their rear ends to provide supports for the multiple spacing means at different distances apart and at different distances lengthwise of the cart, said receptacle portion comprising a base member inclined slightly upwardly from the rear toward the front end thereof, a U-shaped sheet metal container open at its rear end and mounted on said base member, means comprising a rear upright frame member of inverted U-shape straddling the container and serving to reinforce the same at its open rear end and to provide connecting means between the container and the base member, said U-shaped member including side arms secured externally to the sides of the container and having extensions underlying and secured to the base member, and having an upper connecting portion adapted to serve as a handle for the cart, an inwardly swinging plate member pivotally mounted at its upper end between the side arms of the U-shaped member, said plate member serving as a rear closure for the receptacle, and stop means for said rear closure member carried by said base member, said multiple spacing means interconnecting the receptacle portion of the wheeled undercarriage comprising two pairs of uprights of unequal height, each upright being connected at its upper end to the base member of the receptacle portion and at its lower end to one of the side frame members of the undercarriage, the longer pair being spaced slightly forwardly of the rear pair, said rear pair having downward extensions to provide supports for a pair of rear wheels for the cart.

References Cited in the file of this patent

UNITED STATES PATENTS

| Number | Name | Date |
|---|---|---|
| D. 155,971 | Concklin | Nov. 15, 1949 |
| D. 156,702 | Concklin | Jan. 3, 1950 |
| 356,343 | Bardell | Jan. 18, 1887 |
| 1,181,907 | Long | May 2, 1916 |
| 2,479,530 | Watson | Aug. 16, 1949 |
| 2,508,670 | Goldman | May 23, 1950 |